A. W. COPLEY.
ELECTRICAL REGULATING SYSTEM.
APPLICATION FILED JAN. 14, 1918.
1,381,283.
Patented June 14, 1921.
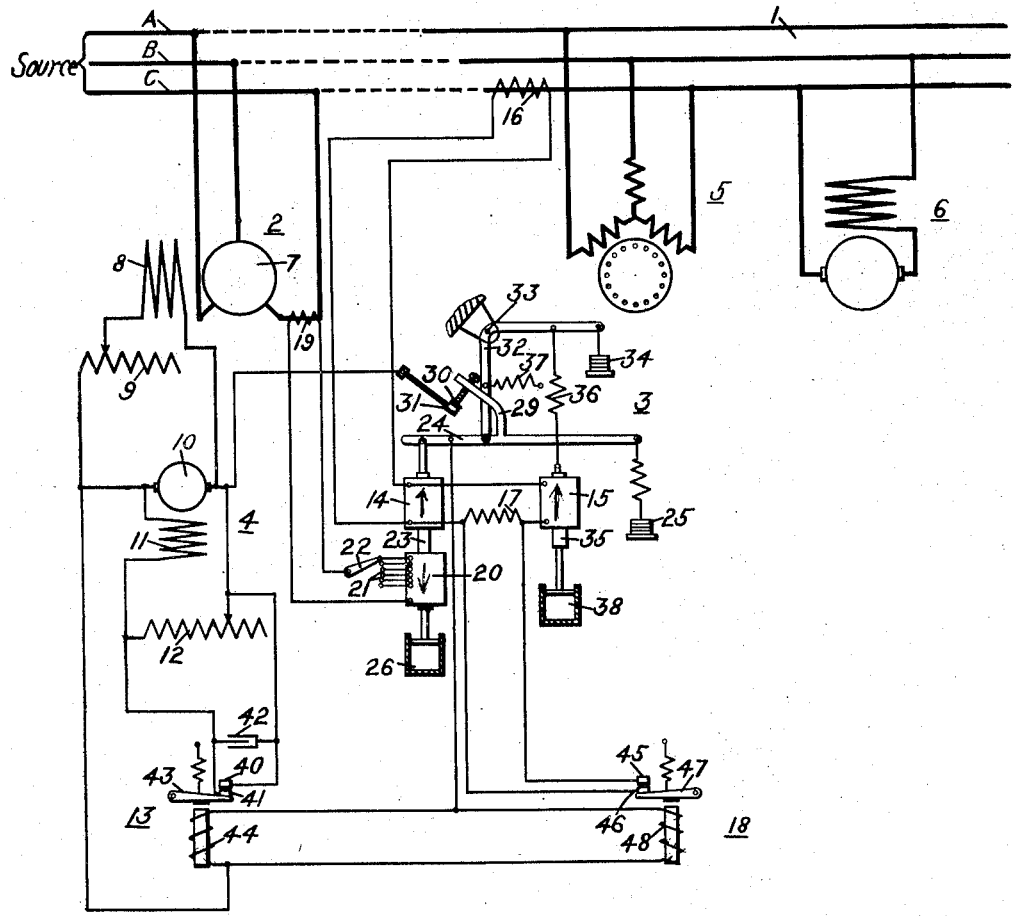
WITNESSES:
W. S. Reece
W. R. Coley
INVENTOR
Almon W. Copley
BY
Wesley G. Carr
ATTORNEY

UNITED STATES PATENT OFFICE.

ALMON W. COPLEY, OF WILKINSBURG, PENNSYLVANIA, ASSIGNOR TO WESTING-HOUSE ELECTRIC AND MANUFACTURING COMPANY, A CORPORATION OF PENN-SYLVANIA.

ELECTRICAL REGULATING SYSTEM.

1,381,283.  Specification of Letters Patent.  Patented June 14, 1921.

Application filed January 14, 1918. Serial No. 211,730.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Electrical Regulating Systems, of which the following is a specification.

My invention relates to regulating systems for dynamo-electric machines and especially to power-factor regulation in connection with a distribution circuit that is associated with a synchronous condenser in the power-house.

In some power systems, it may be desirable to provide a certain degree of power-factor regulation without resorting to an expensive power-factor regulator for accurately governing the system under all conditions of load.

It is the object of my present invention, therefore, to provide such partial regulation, which may be adjusted to provide a satisfactory degree of compensation in the region of full-load conditions, and, although, when light-load conditions obtain in the system, the power-factor correction may not be complete, such a condition is of minor importance by reason of the small load that is supplied at the time.

More specifically stated, it is the object of the present invention to provide a voltage regulator of any approved type, in conjunction with a synchronous condenser that is employed for compensating for large variations of wattless current by reason of a heavily inductive load upon the system, the ratio of total current supplied to the distribution circuit to the wattless current flowing through the synchronous condenser being maintained substantially constant over a predetermined range of operating conditions.

The single figure in the accompanying drawing is a diagrammatic view of a system embodying my invention.

A power system, in connection with which my present invention may conveniently be employed, comprises a plurality of bus-bars or main supply-circuit conductors A, B and C which are energized from any suitable source of alternating-current energy, as indicated by the legend "Source," one or more distribution circuits 1 being supplied from the power-house bus-bars, with which is also associated a synchronous condenser 2 for the customary purpose of producing a leading current, by reason of over-excitation of the condenser, to compensate, to a predetermined extent, for lagging current conditions in the distribution circuit 1. A regulator 3, of a familiar type, is shown as associated with an exciter 4 for the field-magnet winding of the synchronous condenser 2, whereby the desired automatic power-factor regulation may be accomplished, as hereinafter more fully set forth.

The distribution circuit 1 may be employed for any usual purpose, such as supplying energy to three-phase induction motors 5 or single-phase commutator motors 6 of the railway type, or both, whereby lagging currents, with the consequent low power-factor conditions, tend to be produced in the distribution circuit 1 by reason of the heavily inductive character of the connected load.

The synchronous condenser 2 may be of any well-known form and is shown as comprising a three-phase stator winding 7, the terminals of which are connected to the respective bus-bars A, B and C, and a rotatable field-magnet winding 8, which is connected, through the customary main regulating rheostat 9, to the terminals of the armature 10 of the exciter 4. A suitable energizing winding 11 is provided for the exciter 4 and is connected through a regulating rheostat 12 across the terminals of the exciter armature 10. A rheostat-shunting relay 13, which forms a part of the regulator 3, is adapted to rapidly open and close a short-circuit around the regulating rheostat 12 to thereby maintain the desired excitation of the synchronous condenser 2 under predetermined varying-load conditions.

The regulator 3 further comprises a main control magnet 14 and a vibrating magnet 15, both of which are energized from the secondary winding 16 of a series transformer that is energized in accordance with the total load current of the distribution circuit 1, a resistor 17, which is adapted to be short-circuited by a vibrating-magnet relay 18, under predetermined conditions, being connected in series relation with the vibrating magnet 15 for a purpose to be set forth. A second series transformer winding 19, which is energized in accordance with the current traversing the synchronous condenser 2, is employed to energize a third control magnet 20 which is provided with a plurality of taps 21, whereby a shifting connection or arm 22 may be utilized to vary the active number of turns of the control magnet 20 which, as indicated by the corresponding arrow, acts downwardly upon a core member 23 in opposition to the upward magnetizing action of the main control magnet 14. The core member 23 is pivotally associated with one end of a floating lever member 24, upon the other end of which is resiliently suspended a suitable counterweight 25. A dash-pot 26 for the core member 23 is also provided, in accordance with customary regulator practice.

The floating lever member 24 is provided with an upwardly and laterally projecting arm 29, with which is associated the main movable contact terminal 30 to vibrate into and out of engagement with the main stationary contact terminal 31, under operating conditions. A bell-crank lever 32 has its downwardly-extending arm pivotally associated with the floating lever 24 to the left of the arm 29, and the outer end of the horizontal bell-crank arm is provided with a suitable counter-weight 34. The bell-crank lever 32 is pivoted at a central point 33 to a stationary portion of the regulator frame, the entire movable structure of the main control element being thus supported at the pivotal point 33. A magnetizable core 35 is arranged to be attracted upwardly by the vibrating magnet 15, a suitable spring device 36 being utilized to connect the core member 35 to an intermediate point of the horizontal arm of the bell-crank lever 32, which is biased to the desired normal position by means of a control-adjusting spring 37. A dash-pot 38 is preferably provided to suitably retard movements of the core member 35.

The rheostat-shunting relay 13 comprises a stationary contact 40 and a coöperating movable contact terminal 41, a suitable condenser 42 being shunted across the contact terminals for the customary purpose of preventing injurious sparking between them. The movable contact terminal 41 is mounted upon a swinging armature 43, the oscillation of which is differentially controlled by a magnet coil 44 and an upwardly-biasing spring, in accordance with a familiar construction. As previously stated, the relay device 13 is adapted to open and close a short-circuit around the regulating rheostat 12 for the exciter field winding. The vibrating-magnet relay 18 is of a similar construction comprising coöperating stationary and movable contact members 45 and 46, respectively, a vibrating armature 47, upon which the movable contact 46 is mounted, and a magnet coil 48 acting in opposition to an upwardly-biasing spring.

Assuming, for example, that, under normal operating conditions of the entire illustrated system, the power-factor upon the distribution circuit 1 is 80% lagging, corresponding to a flow of 60% wattless current, the current in control magnet 20, which is proportional to the leading current traversing the synchronous condenser 2, should equal 60% of the current in the oppositely-acting main control magnet 14, which is energized from the load-current series transformer 16, in order to maintain unity power-factor at the power-house. To accomplish this result, the adjustment of the shifting arm 22, with respect to the taps 21 of the control magnet 20, should be such as to provide a number of energizing turns in the control magnet 20 equaling 100/60 of the number of turns in the entire main control magnet 14. This statement is made under the usual assumption that the magnet coils 14 and 20 will substantially balance each other with respect to their action upon the floating core member 23 when their ampere-turns are equal.

It will be understood that, if some power-factor, other than unity, is desired at the power-house, this result may readily be attained by suitable adjustment of the number of active turns in the variable control magnet 20.

As the remaining connections of the regulator 3 are well-known to those skilled in the art, only a brief description thereof will be necessary. The main contact terminals 30 and 31 are connected to energize the parallel-related actuating coils 44 and 48 for the rheostat-shunting relay 13 and the vibrating-magnet relay 18, respectively, whenever load conditions in the distribution circuit 1 tend to increase with respect to the current traversing the synchronous condenser 2. The resultant short-circuiting of the regulating rheostat 12 for the exciter 4 causes the leading current in the synchronous condenser 2 to increase, by reason of the augmented excitation of the condenser, to compensate for the increased lagging current in the distribution circuit 1 and thus maintain the desired unity power-factor at the power-house.

The general regulating action of the regulator 3 is well-known in the art, and, consequently, no extended description thereof is necessary in the present application. It will be understood that the regulating rheostat 12 for the exciter 4 is rapidly cut into and out of circuit in accordance with the vibration of the rheostat-shunting relay 13, which is controlled by the opening and closing of the main contact terminals 30 and 31, the main control magnet 14 tending to open the main contact terminal under increased load conditions by drawing the core member 23 upwardly. When the main contact terminals are opened, the vibrating-magnet relay 18 also has its actuating coil 48 deënergized to close the corresponding contact members 45 and 46, thus short-circuiting the external resistor 17 to strengthen the upward pull of the vibrating magnet 15 upon the core member 35 and thus permit the control spring 37 to close the main contact members. In this way, the well-known rapidly vibrating regulator action is secured.

It will be seen that I have thus provided a regulating system, whereby unity, or any other prescribed power factor, may be maintained at the power-house between predetermined load limits on in a distribution circuit, a substantially constant ratio between the leading current traversing the synchronous condenser and the current in the distribution circuit being automatically maintained. As previously stated, although, under light-load conditions, with a power-factor different from the full-load power-factor, complete and exact regulation thereof will not be effected by the present system, such a condition is not of material importance.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a source of alternating-current energy, a distribution circuit and a synchronous condenser interposed between said source and said circuit, of regulating means for automatically maintaining a substantially constant power factor at said source and controlled jointly by the current conditions of said synchronous condenser and said distribution circuit.

2. The combination with a source of alternating-current energy, a distribution circuit and a synchronous condenser interposed between said source and said circuit, of an exciting circuit for said synchronous condenser, and a regulator having a main control element operated by the condenser current and the distribution-circuit current for regulating the energization of said exciting circuit.

3. The combination with a source of alternating-current energy, a distribution circuit and a synchronous condenser interposed between said source and said circuit, of an exciter for said synchronous condenser, a regulator having a main control element operated oppositely by the condenser current and the distribution-circuit current, and a relay governed by said control element for regulating the energization of said exciter.

4. The combination with a source of alternating-current energy, a distribution circuit and a synchronous condenser interposed between said source and said circuit, of an exciting circuit for said synchronous condenser, a regulator for said exciting circuit having a main control element provided with a plurality of oppositely-acting magnet coils respectively energized in accordance with the condenser current and with the distribution-circuit current, and means for adjusting one of said coils to compensate for the difference in the power-factors of said source and of said distribution circuit.

5. The combination with a source of alternating-current energy, a distribution circuit and a synchronous condenser interposed between said source and said circuit, of regulating means operated in accordance with the condenser current and with the distribution-circuit current for governing the power-factor of said source during variations of load in said distribution circuit.

6. The combination with a source of alternating-current energy, a distribution circuit and a synchronous condenser interposed between said source and said circuit, of an exciter for said synchronous condenser, and a regulator having a main control element operated oppositely by the condenser current and the distribution - circuit current for maintaining the power-factor of said source constant during variations of load in said distribution circuit.

In testimony whereof I have hereunto subscribed my name this 31st day of Dec., 1917.

ALMON W. COPLEY.